United States Patent
Wang

(10) Patent No.: US 12,535,592 B1
(45) Date of Patent: Jan. 27, 2026

(54) POLARIZATION APPARATUS AND METHOD FOR STRAY LIGHT REDUCTION IN A LIDAR

(71) Applicant: Zoox, Inc., Foster City, CA (US)

(72) Inventor: Haiming Wang, Fremont, CA (US)

(73) Assignee: Zoox, Inc., Foster City, CA (US)

( * ) Notice: Subject to any disclaimer, the term of this patent is extended or adjusted under 35 U.S.C. 154(b) by 1119 days.

(21) Appl. No.: 17/520,023

(22) Filed: Nov. 5, 2021

(51) Int. Cl.
| | |
|---|---|
| *G01S 17/931* | (2020.01) |
| *B60W 60/00* | (2020.01) |
| *G01S 7/481* | (2006.01) |
| *G02B 5/30* | (2006.01) |
| *G02B 26/08* | (2006.01) |
| *G02B 26/10* | (2006.01) |
| *G02B 27/28* | (2006.01) |

(52) U.S. Cl.
CPC ....... *G01S 17/931* (2020.01); *B60W 60/0015* (2020.02); *G01S 7/4814* (2013.01); *G01S 7/4817* (2013.01); *G02B 5/3083* (2013.01); *G02B 26/0833* (2013.01); *G02B 26/105* (2013.01); *G02B 27/283* (2013.01); *B60W 2420/408* (2024.01); *B60W 2554/802* (2020.02); *B60W 2710/06* (2013.01); *B60W 2710/08* (2013.01); *B60W 2710/18* (2013.01); *B60W 2710/20* (2013.01)

(58) Field of Classification Search
CPC .... G02B 277/28; G02B 5/3083; G01S 7/4812
See application file for complete search history.

(56) References Cited

U.S. PATENT DOCUMENTS

| | | | |
|---|---|---|---|
| 2011/0181881 A1* | 7/2011 | Mathur | G01N 15/0205 356/342 |
| 2018/0113200 A1* | 4/2018 | Steinberg | G01S 7/4812 |
| 2020/0319314 A1* | 10/2020 | Behzadi | G01S 17/89 |

* cited by examiner

*Primary Examiner* — Robert W Hodge
*Assistant Examiner* — Clara G Chilton
(74) *Attorney, Agent, or Firm* — EIP US LLP

(57) ABSTRACT

The lidar systems may reduce stray light interference. A system may comprise a laser system which, upon receiving a signal at a first time, generates an illumination light. A polarizing beam splitter (PBS) may receive the illumination light from the laser system along a first light path and the illumination light may exit from the PBS along a second light path. A quarter wave plate (QWP) may receive the illumination light exiting from the PBS along the second light path and may pass the illumination light to an object from which the illumination light is reflected. A detector arranged proximate the PBS may receive the reflected light from the PBS along a third light path and may detect the reflected light at a second time, and a processor may determine a distance to the object based at least in part on the illumination light and the reflected light.

20 Claims, 5 Drawing Sheets

POLARIZATION APPARATUS AND METHOD FOR STRAY LIGHT REDUCTION IN A LIDAR

BACKGROUND

Optical sensing systems, whether passive or active, are used in a variety of applications. For example, in robotic applications, cameras, lidars, and time-of-flight sensors may be used to receive information about an environment proximate a vehicle to help inform the vehicle how to navigate through such an environment. However, stray light impinging on any such optical sensor will distort or otherwise provide bad data which, in turn, may cause safety issues for systems which rely on accurate signals for operation (including autonomous driving).

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
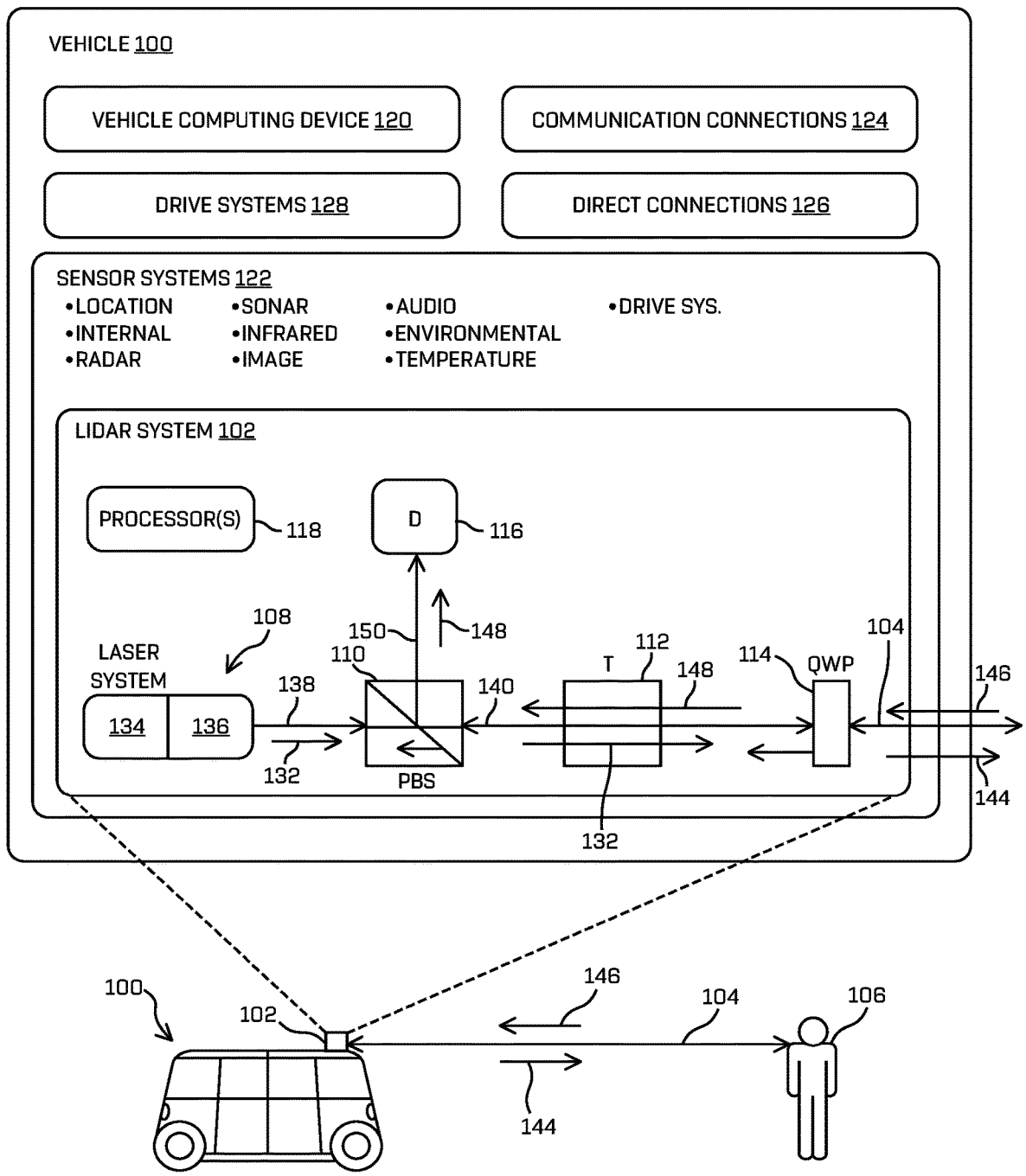
FIG. 1 is a schematic view of an example vehicle lidar system.

This disclosure relates to reduction of stray light for optical systems, including light detection and ranging (Lidar) systems. In examples described herein, lidar systems use an illumination light to illuminate an object and a characteristic of a reflected light reflected from the object is detected and is used in determining the distance to the object. The lidar systems disclosed reduce or eliminate stray light, which may otherwise interfere with the system's ability to make accurate measurements of the distance. Stray light in conventional lidar systems may be misinterpreted as the reflected light returning from the object to which the distance is to be determined. Since the stray light may have one or more different characteristics from the actual reflected light returned from the object, using the stray light can result in incorrect distance measurements.

The concepts described herein are useful in many areas of technology where accurate measurements are required or essential. Lidar systems may be used in vehicles having Advanced driver-assistance systems (ADAS) and may be used in vehicles for other levels of driving improvement from manual to fully autonomous. ADASs are used in vehicles to assist drivers in detecting safety related issues around the vehicle. Having the lidar systems described herein provide accurate measurements to the ADAS may increase the accuracy ADAS. This may translate into a safer and more reliable ADAS which may then inspire driver confidence in the ADAS system. The driver is then more likely to keep the ADAS system operational rather than trying to de-activate it for providing false alarms or other consequences of inaccurate measurements.

In some examples, the lidar systems described herein may be used in Autonomous Vehicles (AVs). AVs may use the lidar systems for navigation in which the distance measurements may be used to determine distances to other movable objects or surfaces of objects, such as vehicles, people, animals, and other movable objects. The lidar system may be used to determine distances to non-movable objects or surfaces of objects such as curbs, road signs, buildings, and other objects. The lidar systems may be used with the AVs control system to navigate the AV relative to the movable and non-movable objects. The lidar systems may be used to maintain the AV at an appropriate distance and/or speed relative to one or more object, and to navigate the AV according to safety requirements. The AV control system may include one or more of steering, propulsion, and braking, or other vehicle systems. Inaccurate measurements resulting from stray light in a conventional lidar system may result in an AV control system providing safety or other operations when not needed, or not providing these operations when needed. For example, a measurement that is inaccurate may cause the AV control system to stop the AV when it shouldn't because it incorrectly determines that an object is closer than it is in reality. As another example, a measurement that is inaccurate may cause the AV control system to turn the AV to avoid an object that is incorrectly determined to be closer than it is in reality. In other inaccurate measurements may cause other inappropriate AV actions. In some examples, the lidar system may be integrated into the AVs control systems, in other examples the lidar system may be a separate system that communicates with the AVs control system.

In an example, a lidar system may include a laser system for generating an illumination light. The illumination light has a linear polarization in a first orientation and is generated at a first time. The laser system may include a laser that produces the linearly polarized illumination light at the first linear polarization, or may include one or more optical components that convert laser light emitted from the laser to the linearly polarized illumination light, for example using a half wave plate, and/or a polarizer. The lidar system also includes a polarizing beam splitter (PBS) that is arranged to receive the illumination light from the laser system along a first light path and arranged so that the illumination light exits from the PBS along a second light path. In some examples, the first and second light paths are co-linear, and in some examples, the second light path is at an angle to the first light path.

The lidar system also includes a quarter wave plate (QWP) that is arranged to receive the linearly polarized illumination light exiting from the PBS along the second light path. The QWP converts the illumination light from the first linear polarization to a non-linearly polarized illumination light (e.g., circularly polarized, elliptically polarized, etc.). In various examples, circularly polarized or elliptically polarized illumination light may be clock-wise or counter-clockwise.

After the QWP converts the illumination light the QWP sends the non-linearly polarized illumination light to an object for distance detecting. The non-linearly polarized illumination light reflects off of the object and is then non-linearly polarized reflected light. As used herein, illumination light is light that is sent to the object, and reflected light is light after it is reflected from the object. The non-linearly polarized reflected light is received at the QWP and is converted from non-linearly polarized reflected light to linearly polarized reflected light. The linearly polarized reflected light has a second linear polarization that is perpendicular to the first linear polarization.

The PBS is arranged to receive the linearly polarized reflected light along the second light path, and arranged so that the linearly polarized reflected light exits from the PBS along a third, different light path. In order for the linearly polarized reflected light to travel from the second light path to the third light path, the linearly polarized reflected light has to have a linear polarization that is perpendicular to the linear polarization of the illumination light in the first path.

The lidar system includes a detector that is arranged to receive the linearly polarized reflected light from the PBS along the third light path to detect the linearly polarized reflected light from the PBS at a second time, that is different than the first time. The lidar system includes a processor for determining a distance to the object based at least in part on the detected linearly polarized reflected light and the generated illumination light.

Stray light may be generated within the lidar system by reflections of the illumination light off of one or more components. For example, the QWP may create stray light by reflecting some of the illumination light back toward the PBS. In some examples, the lidar system may include other components and one or more of these components may create stray light by reflecting some of the illumination light back toward the PBS. Any such light that reaches the detector may be able to cause incorrect distance measurements. However, the optical setup described herein ensures this stray light does not reach the detector and/or otherwise minimizes any bad data caused by such stray light. Since the stray light has the same linear polarization as the illumination light generated by the laser system, the stray light just travels back through the PBS and not towards the detector.

Example systems and methods are described below in the context of vehicles, including passenger vehicles having ADAS, and autonomous vehicles. However, the techniques of the present disclosure are not so limited and may equally be used for other technology which may make use of lidar systems. Further, though described in terms of lidar systems, it should be appreciated that the techniques presented herein may be similarly used in other optical systems including cameras, time-of-flight sensors, and the like.

FIG. 1 is a schematic view of an example vehicle 100. The vehicle 100 may be an autonomous vehicle configured to operate according to a Level 5 classification defined by the U.S. National Highway Traffic Safety Administration. This classification describes a vehicle capable of performing all safety-critical functions for an entire trip, without occupants of the vehicle being required to control the vehicle at any time. In other examples, the vehicle 100 may a non-autonomous vehicle, or a fully or partially autonomous vehicle having a different level of classification.

The vehicle 100 may include a lidar system 102 for determining a distance 104 between the vehicle 100 and an object 106. The vehicle 100 may include one or more individual lidar systems 102 which may be located at the corners, front, back, sides, and/or top of the vehicle 100. While distance is shown from the lidar system, or a portion of the lidar system to an object herein, the lidar system may take into account relative distances between components of the vehicle and the lidar, or various components of the lidar itself when determining distances to objects.

The example lidar system 102 may include a laser system 108, a PBS 110, a telescope 112, a QWP 114, a detector 116, and a processor 118. The detector 116 may be communicatively coupled to the processor 118 for data communications which may include data related to the distance 104 to the object 106, to time (e.g., the time between emission and detection), to frequencies (or changes in frequencies), and the like. The laser system 108 may be communicatively coupled to the processor 118 for data communications which may include data relating to generation of laser light and may include data related to time.

The vehicle 100 may include vehicle computing device(s) 120, one or more sensor systems 122, which may include lidar system 102, one or more communication connections 124, at least one direct connection 126 (e.g., for physically coupling the vehicle 100 to exchange data and/or to provide power), and one or more drive systems 128. In some examples, the processor 118 may be included in the vehicle computing device(s) 120. In some examples, the processor 118 may be part of the lidar system 102 and may be separate from the computing device(s) 120.

The laser system 108 may generate an illumination light 132 having a first linear polarization at a first time. The laser system 108 may be controlled by the processor 118 to generate the illumination light 132 at the first time, or the laser system 108 may communicate to the processor 118 when the illumination light 132 is generated. The processor 118 may control when the laser system 108 generates the illumination light 132 and/or may control one or more characteristics of the illumination light 132. In an example, the processor 118 may control the laser system 108 to generate the illumination light 132 in pulses. In some examples, the processor 118 may control the laser system 108 to generate the illumination light 132 as modulated light.

The laser system 108 may include a laser 134 that generates the first linear polarization at a specific orientation. In some examples, such as the example shown in FIG. 1, the first linear polarization may be P-polarized. In some examples, the first linear polarization may be S-polarized. In some examples, the laser system 108 may include the laser 134 and a half wave plate (HWP) 136 that converts light generated by the laser 134 to the illumination light 132 having the first linear polarization. In some examples, the laser system 108 includes the laser 134 but does not include the HWP 136 and the laser 134 is oriented such that the laser system 108 generates the illumination light 132 at the first linear polarization. In some examples, the laser system 108 may include a polarizer to polarize the illumination light 132. In some examples, the light in the lidar system 102 may be directed using one or more waveguides (not shown).

The illumination light 132 may be passed to the PBS 110 along a first light path 138. The illumination light 132 may be exit from the PBS 110 along a second light path 140. The PBS 110 may be a cube or plate type PBS, or other configuration that separates P and S linearly polarized light. In some examples the PBS 110 may be a prism.

In some examples, the lidar system 102 may include the telescope 112 to control the spread of the illumination light 132. In some examples, the telescope 112 may be positioned in the lidar system 102 between the PBS 110 and the QWP 114, as shown in FIG. 1. In some examples, the telescope 112 may be positioned between the laser system 108 and the PBS 110. In some examples, the telescope 112 may comprise two lenses and the QWP 114 may be positioned between the two lenses. In some examples, the QWP 114 may be positioned between the PBS 110 and the telescope 112. In an example, the telescope 112 can be configured to collimate the illumination light 130. The telescope 112 may control the spread of the illumination light 130 and may collimate the illumination light 130 into a collimated beam of illumination light 130 which may propagate a longer distance than non-collimated light. In some examples, the telescope can be configured to spread the illumination light over an area of the object.

The QWP 114 may be arranged to receive the illumination light 132 exiting from the PBS 110, either directly, or through the telescope 112 when included. In the example shown in FIG. 1, the telescope 112 may receive the linearly polarized illumination light 132 from the PBS and may produce linearly polarized illumination light 132 that, at least in some examples, is collimated. The QWP 114 receives the illumination light 132 and may convert the linearly polarized illumination light 132 to non-linearly polarized illumination light 144. The non-linearly polarized illumination light 144 may be circularly polarized or may be elliptically polarized.

The non-linearly polarized illumination light 144 exits the QWP 114 and the non-linearly polarized illumination light 144 travels to the object 106 for distance detecting, e.g., an object 106 to which the lidar system 102 is measuring the distance. The non-linearly polarized illumination light 144 is reflected from the object 106. After illumination light is reflected from an object it is referred to herein as reflected light. The non-linearly polarized illumination light 144 is reflected from the object as non-linearly polarized reflected light 146 which is received by the QWP 114. The QWP 114 converts the non-linearly polarized reflected light 146 to linearly polarized reflected light 148 having a second linear polarization that is perpendicular to the first linear polarization. In some examples, when the first linear polarization is P-polarization, such as in the example shown in FIG. 1, the second linear polarization is S-polarization. In some examples, when the first linear polarization is S-polarization, the second linear polarization is P-polarization.

The linearly polarized reflected light 148 passes through the telescope 112 (in the example shown in FIG. 1) to the PBS 110. The telescope 112, may be included so that the reflected light returning to the QWP has a higher power density than if the illumination light were not collimated.

The telescope 112 may focus the collimated linearly polarized reflected light 148. The PBS 110 receives the linearly polarized reflected light 148 from the QWP 114 along the second light path 140, and the linearly polarized reflected light 148 exits from the PBS 110 along a third, different light path 150.

The detector 116 may be arranged to receive the linearly polarized reflected light 148 exiting from the PBS 110 along the third light path 150. The detector 116 may detect the linearly polarized reflected light 148 at a second time. The detector 116 may produce data related to the detection of the reflected light 148 at the second time and may communicate the data to the processor 118. The processor 118 may receive the data and may use the data for determining the distance 104 to the object 106 based at least in part on the detected linearly polarized reflected light 148 and the generated illumination light 132. In some examples, the lidar system may take into account the position of the lidar system on the vehicle when determining a distance from the vehicle to the object. In some examples, the processor 118 may use a relative difference in distance between the first light path and the third light path.

In some examples, such as the example shown in FIG. 1, the first linear polarization is P-polarization, and the second polarization is S-polarization, and the first light path 138 and the second light path 140 are co-linear, and the third light path 150 is perpendicular to the first light 138 path and second light path 140. In this example, the P-polarized illumination light 132 from the laser system 108 passes through the PBS 110 without changing direction, and the S-polarized reflected light 148 is reflected by the PBS 110 along the third path 150 towards the detector 116.

In the example shown in FIG. 1, since the PBS 110 reflects S-polarized light and passes P-polarized light, stray light, such as stray light 152 which is shown reflecting from QWP 114 is P-polarized light and passes through the PBS 110 toward the laser system 108 rather than being reflected toward the detector 116. This prevents the stray light 152 from interfering with the reflected light 148 which is used in determining the distance 104 since only light which has been passed into the environment (e.g., via the QWP), reflected off of an external surface, and received via the QWP will have the correct polarization to be reflected in the direction of the detector. Of course, there may be sources of such polarization in the environment, but the power level of such sources are negligible in comparison to the power levels of the linearly polarized reflected light 148.

In some examples, the laser system 108 may generate pulses of illumination light 132 and the illumination light 132 generated at the first time may be one or more of those pulses. In some examples, the detector 116 may detect one or more pulses of reflected light at the second time. In some examples, the processor 118 may determine the distance 104 to the object 106 based at least in part on a difference between the first time and the second time. In some examples, the processor 118 may determine the distance 104 to the object 106 based at least in part on the time difference and the speed of light.

In some examples, the laser system 108 may generate modulated illumination light 132 and the illumination light 132 generated at the first time may be the modulated illumination light. In some examples, the detector 116 may detect the modulated reflected light at the second time. In some examples, the processor 118 may determine the distance 104 to the object 106 based at least in part on a difference in phase of the modulated detected linearly polarized reflected light relative to a phase of the modulated generated illumination light. In some examples, the processor 118 may determine the distance 104 to the object 106 based at least in part on the difference in phase and the speed of light.

Figure 2:
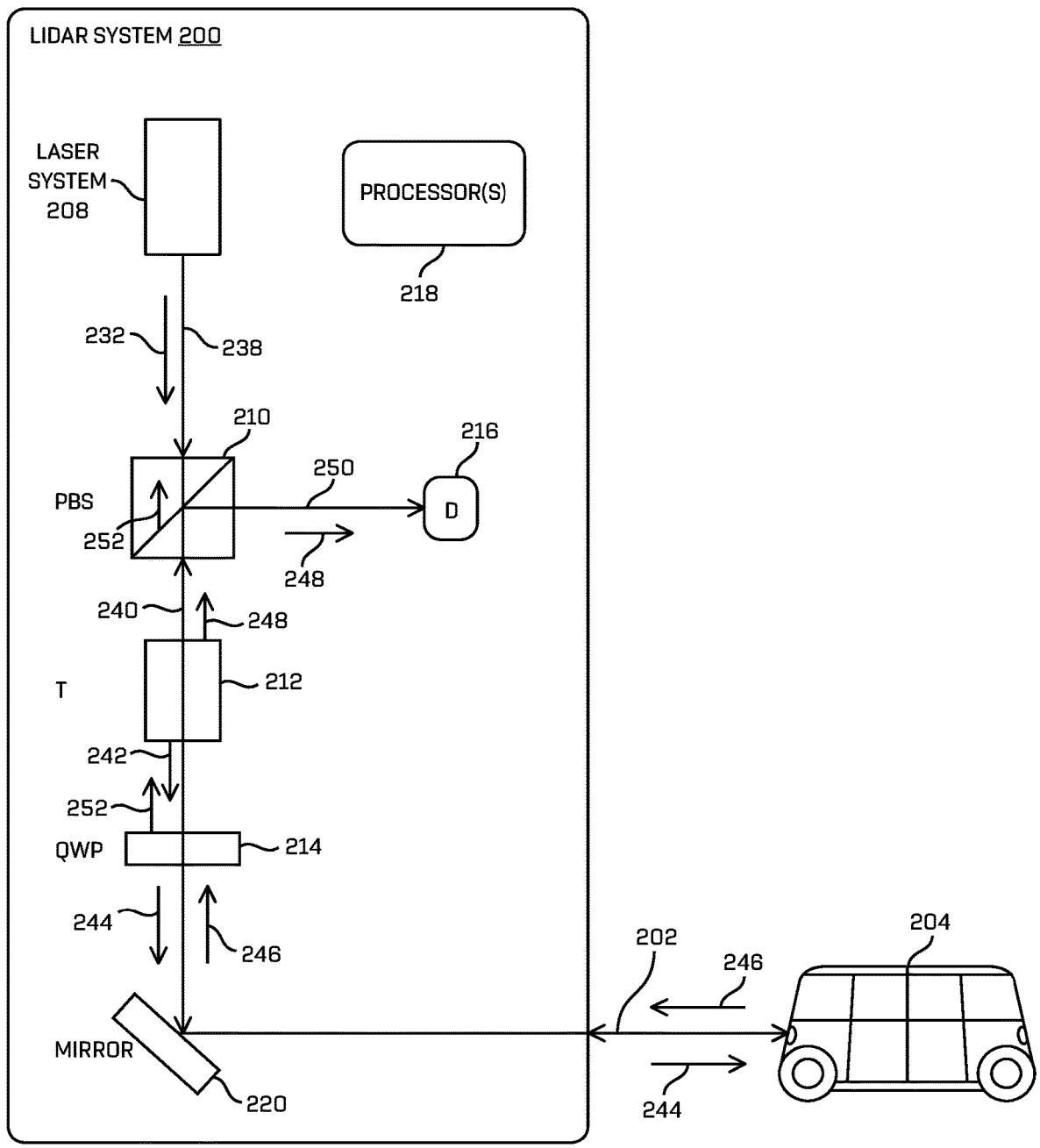
FIG. 2 is a schematic view of another example lidar system.

FIG. 2 depicts an example of a lidar system 200 for determining a distance 202 to an object 204. In some examples, the lidar system 200 may be incorporated into a vehicle, such as vehicle 100 shown in FIG. 1 and may replace lidar system 102 or be in addition to lidar system 102. In some examples, the lidar system 200 may be separate from the vehicle 100 and may include a display or communication connection to communicate determined distances.

Lidar system 200 may include a laser system 208, a PBS 210, a telescope 212, a QWP 214, a detector 216, a processor 218, and a mirror 220. The detector 216 may be communicatively coupled to the processor 218 for data communications which may include data related to the distance 202 to the object 204 and may include data related to time. The laser system 208 may be communicatively coupled to the processor 218 for data communications which may include data relating to generation of laser light and may include data related to time. In some examples, the processor 218 may be part of the vehicle. In some examples, there may be more than one processor 218.

The laser system 208 may generate an illumination light 232 having a first linear polarization at a first time. The laser system 208 may be communicatively coupled to the processor 218. The laser system 208 may generate the illumination light 232 in pulses, as modulated light and/or in another waveform. The illumination light 232 may be passed to the PBS 210 along a first light path 238. The illumination light 232 may exit from the PBS 210 along a second light path 240.

The telescope 212 may be positioned in the lidar system 200 between the PBS 210 and the QWP 214. In at least some examples, the telescope 212 may receive the linearly polarized illumination light 232 from the PBS 210 and may produce a collimated linearly polarized illumination light 242.

The QWP 214 may be arranged to receive the illumination light 232 exiting from the PBS 210, either directly, or illumination light 242 through the telescope 212 when included. The QWP 214 receives the illumination light 232 from the PBS 210 and may convert the linearly polarized illumination light 232 to non-linearly polarized illumination light 244. The non-linearly polarized illumination light 244 may be circularly polarized or may be elliptically polarized.

The non-linearly polarized illumination light 244 may travel from the QWP 214 to the object 204 for distance detecting. In the example shown in FIG. 2, after passing through the QWP 214, the non-linearly polarized illumination light 244 may be directed to the object 204 via the mirror 220.

In some examples, the mirror 220 may be a scanning mirror that is configured to direct the direct the illumination light 244 to the object 204 in a scanning motion in which the illumination light 244 is directed across an area of the object 204 and reflected from the area of the object 204 back to the mirror 220. In various examples, such a mirror may comprise scanning over a range of elevation and azimuth angles, whereas in other examples, a single dimension may be scanned by one or more such beam sources. In some examples, the mirror 220 may be or include an electromechanical device. In some examples, the mirror 220 may be or include a microelectromechanical system (MEMS) mirror.

The non-linearly polarized illumination light 244 is reflected from the object 204 as non-linearly polarized reflected light 246 which is received by the QWP 214 via the mirror 220. The QWP 214 converts the non-linearly polarized reflected light 246 to linearly polarized reflected light 248 having a second linear polarization that is perpendicular to the first linear polarization.

The linearly polarized reflected light 248 passes through the telescope 212 (in the example shown in FIG. 2) to the PBS 210. The PBS 210 receives the linearly polarized reflected light 248 from the QWP 214 along the second light path 240, and the linearly polarized reflected light 248 exits from the PBS 210 along a third, different light path 250.

The detector 216 may be arranged to receive the linearly polarized reflected light 248 exiting from the PBS 210 along the third light path 250. The detector 216 may detect the linearly polarized reflected light 248 at a second time. The detector 216 may produce data related to the detection of the reflected light 248 at the second time and may communicate the data to the processor 218. The processor 218 may receive the data and may use the data for determining the distance 202 to the object 204 based at least in part on the detected linearly polarized reflected light 248 and the generated illumination light 232.

In some examples, such as the example shown in FIG. 2, the processor 218 may determine one or more distances to an object by scanning the illumination light over an area of the object and detecting the reflected light reflected from the area of the object.

Figure 3:
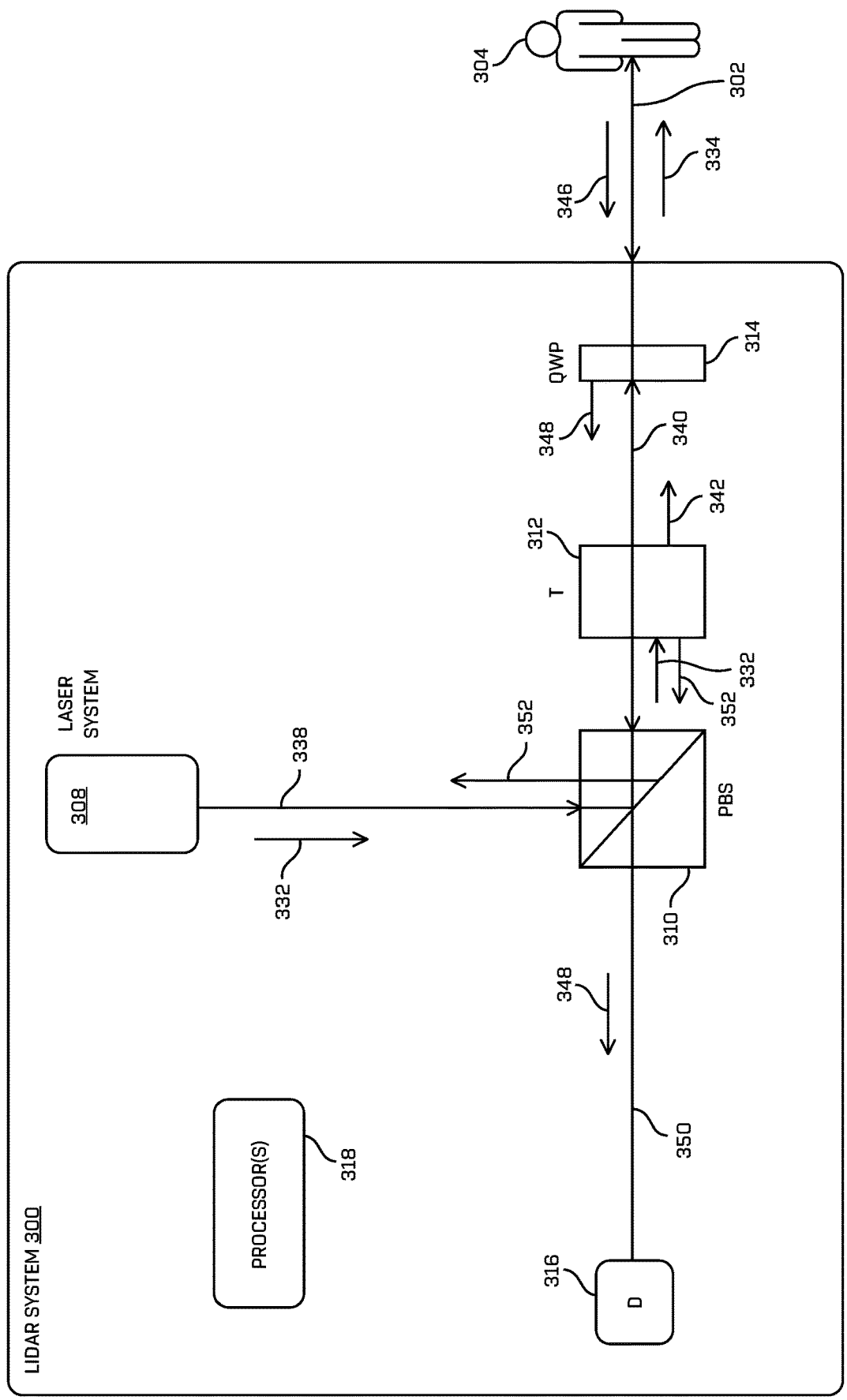
FIG. 3 is a schematic view of another example lidar system.

FIG. 3 depicts an example of a lidar system 300 for determining a distance 302 to an object 304. In some examples, the lidar system 300 may be incorporated into a vehicle, such as vehicle 100 shown in FIG. 1 and may replace lidar system 102 or be in addition to lidar system 102. In some examples, the lidar system 300 may be separate from the vehicle 100 and may include a display or communication connection to communicate determined distances. Of note, the apparatus depicted in FIG. 3 illustrates how the PBS may be rotated (as compared to the device shown in FIG. 1 or 2) to achieve differing placement of the source and detector while achieving the same result of reducing or eliminating stray light.

Lidar system 300 may include a laser system 308, a PBS 310, a telescope 312, a QWP 314, a detector 316, and a processor 318. The detector 316 may be communicatively coupled to the processor 318 for data communications which may include data related to the distance 302 to the object 304 and may include data related to time. The laser system 308 may be communicatively coupled to the processor 318 for data communications which may include data relating to generation of laser light and may include data related to time.

The laser system 308 may generate an illumination light 332 having a first linear polarization at a first time. The laser system 308 may be communicatively coupled to the processor 318. The laser system 308 may generate the illumination light 332 in pulses, as modulated light and/or in another waveform. In some examples, such as the example shown in FIG. 3, the first linear polarization may be S-polarized.

The illumination light 332 may be passed to the PBS 310 along a first light path 338. The illumination light 332 may exit from the PBS 310 along a second light path 340. In some examples, the S-polarized illumination light 332 is reflected by the PBS 310 from the first light path 338 to the second light path 340.

The telescope 312 may be positioned in the lidar system 300 between the PBS 310 and the QWP 314. The telescope 312 may receive the linearly polarized illumination light 332 from the PBS 310 and may produce a collimated S-polarized illumination light 342.

The QWP 314 may be arranged to receive the illumination light 332 exiting from the PBS 310, either directly, or as illumination light 342 through the telescope 312 when included. In the example shown in FIG. 3, the QWP 314 receives the illumination light 342 from the PBS 310 and may convert the linearly polarized illumination light 342 to non-linearly polarized illumination light 344. The non-linearly polarized illumination light 344 may be circularly polarized or may be elliptically polarized.

The non-linearly polarized illumination light 344 may travel from the QWP 314 to the object 304 for distance detecting. The non-linearly polarized illumination light 344 is reflected from the object 304 as non-linearly polarized reflected light 346 which is received by the QWP 314. The QWP 314 converts the non-linearly polarized reflected light 346 to linearly polarized reflected light 348 having a second linear polarization that is perpendicular to the first linear polarization. In some examples, when the first linear polarization is S-polarization, such as in the example shown in FIG. 3, the second linear polarization is P-polarization.

The linearly polarized reflected light 348 passes through the telescope 312 (in the example shown in FIG. 3) to the PBS 310. The telescope 312 may focus the collimated linearly polarized reflected light 348. The PBS 310 receives the linearly polarized reflected light 348 from the QWP 314 along the second light path 340, and the linearly polarized reflected light 348 exits from the PBS 310 along a third, different light path 350.

The detector 316 may be arranged to receive the linearly polarized reflected light 348 exiting from the PBS 310 along the third light path 350. The detector 316 may detect the linearly polarized reflected light 348 at a second time. The detector 316 may produce data related to the detection of the reflected light 348 at the second time and may communicate the data to the processor 318. The processor 318 may receive the data and may use the data for determining the distance 302 to the object 304 based at least in part on the detected linearly polarized reflected light 348 and the generated illumination light 332.

In some examples, such as the example shown in FIG. 3, the first linear polarization is S-polarization, and the second polarization is P-polarization, and the first light path 338 and the second light path 340 are perpendicular, and the third light path 350 is co-linear to the first light 338 path. In this example, the S-polarized illumination light 332 from the laser system 308 passes through the PBS 310 by being reflected, and the P-polarized reflected light 348 is passed through the PBS 310 without reflection by the PBS 310 along the third path 350 towards the detector 316.

In the example shown in FIG. 3, since the PBS 310 reflects S-polarized light and passes P-polarized light, stray light, such as stray light 352 which is shown reflecting from telescope 312 is P-polarized light and is reflected by the PBS 310 back toward the laser system 308 rather than passing straight through toward the detector 316. This prevents the stray light 352 from interfering with the reflected light 348, which is used in determining the distance 302.

Figure 4:
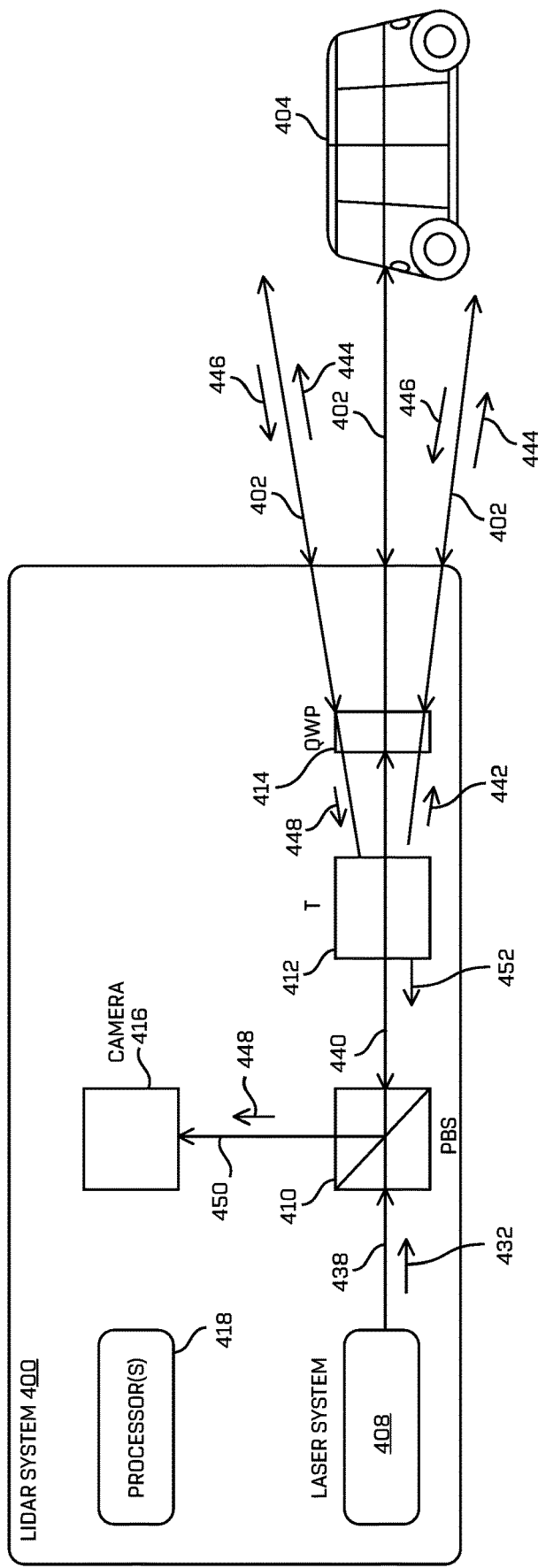
FIG. 4 is a schematic view of another example lidar system.

FIG. 4 depicts an example of a lidar system 400 for determining distances 402 to an object 404. Such an example lidar system 400 may generate a 2.5d "image" of an environment based on a single emission (or flash) of light In some examples, the lidar system 400 may be incorporated into a vehicle, such as vehicle 100 shown in FIG. 1 and may replace lidar system 102 or be in addition to lidar system 102. In some examples, the lidar system 400 may be separate from the vehicle 100.

Lidar system 400 may include a laser system 408, a PBS 410, a telescope 412, a QWP 414, a detector 416, and a processor 418. The detector 416 may be communicatively coupled to the processor 418 for data communications which may include data related to the distances 402 to the object 404 and may include data related to time. The laser system 408 may be communicatively coupled to the processor 418 for data communications which may include data relating to generation of laser light and may include data related to time.

The laser system 408 may generate an illumination light 432 having a first linear polarization at a first time. In some examples, such as the example shown in FIG. 4, the laser system 408 may include a vertical-cavity surface-emitting laser (VCSEL) array as the source of the illumination light 432. The laser system 408 may be communicatively coupled to the processor 418. The laser system 408 may generate the illumination light 432 in pulses, as modulated light and/or in another waveform. In some examples, an array of illumination light 432 is generated as a pulse that illuminates an area of the object 404 using a single pulse to get multiple distances at a single time. The illumination light 432 may be passed to the PBS 410 along a first light path 438. The illumination light 432 may exit from the PBS 410 along a second light path 440.

The telescope 412 may be positioned in the lidar system 400 between the PBS 410 and the QWP 414. The telescope 412 may receive the linearly polarized illumination light 432 from the PBS 410 and may produce a controlled spread, or cone of the linearly polarized illumination light 442. In some examples, the illumination light 442 may cover a relatively larger area on the object than a collimated illumination light.

The QWP 414 may be arranged to receive the illumination light 442 exiting from the PBS 410 through the telescope 412. The QWP 414 receives the illumination light 442 from the telescope 412 and may convert the linearly polarized illumination light 442 to non-linearly polarized illumination light 444. The non-linearly polarized illumination light 444 may be circularly polarized or may be elliptically polarized. The non-linearly polarized illumination light 444 may travel from the QWP 414 to the object 404 for distance detecting.

In some examples, the illumination light 444 is spread over an area of the object 404 and reflected from the area of the object 404 back to the QWP 414. The non-linearly polarized illumination light 444 is reflected from the object 404 as non-linearly polarized reflected light 446 which is received by the QWP 414. The QWP 414 converts the non-linearly polarized reflected light 446 to linearly polarized reflected light 448 having a second linear polarization that is perpendicular to the first linear polarization.

The linearly polarized reflected light 448 passes through the telescope 412 to the PBS 410. The PBS 410 receives the linearly polarized reflected light 448 from the QWP 414 along the second light path 440, and the linearly polarized reflected light 448 exits from the PBS 410 along a third, different light path 450.

The detector 416 may be arranged to receive the linearly polarized reflected light 448 exiting from the PBS 410 along the third light path 450. The detector 416 may detect the linearly polarized reflected light 448 at a second time. In some examples, the detector 416 may be or include an imager that may detect an array of reflected light 448. The detector 416 may produce data related to the detection of the reflected light 448 at the second time and may communicate the data to the processor 418. The processor 418 may receive the data and may use the data for determining the distance 402 to the object 404 based at least in part on the detected linearly polarized reflected light 448 and the generated illumination light 432. The lidar system 400 may prevent stray light, such as stray light 453 reflected by the telescope 412 from reaching the detector 416.

In some examples, the processor 418 may determine more than one distance to an object by flashing the illumination light over an area of the object and detecting the reflected light reflected from the area of the object.

Figure 5:
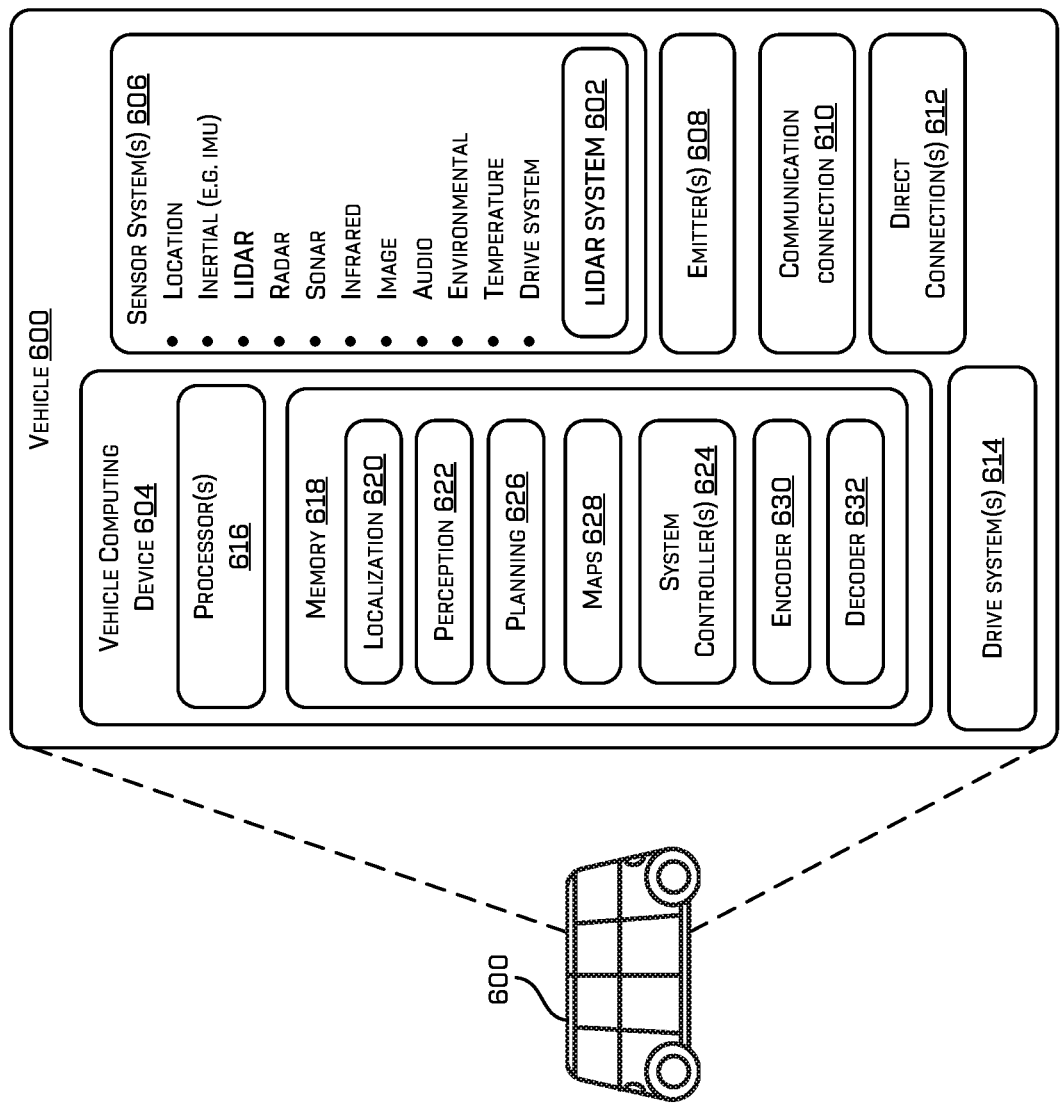
FIG. 5 is a block diagram of an autonomous vehicle and lidar system.

FIG. 5 depicts an example of a vehicle 600 in which one or more lidar system 602 may be included. The lidar system 602 may be one or more of the lidar systems shown in FIGS. 1-4. In some examples, the lidar system 602 may be a short range and/or a long range lidar. The vehicle 600 may include vehicle computing device(s) 604, one or more sensor systems 606, of which one or more may be the lidar system 602, one or more emitters 608, one or more communication connections 610, at least one direct connection 612 (e.g., for physically coupling the vehicle 600 to exchange data and/or to provide power), and one or more drive systems 614.

In some instances, the sensor(s) 606 may include RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), drive system sensors for torque and/or velocity sensing etc. The sensor(s) 606 may include multiple instances of each of these or other types of sensors. For instance, the LIDAR sensors may include individual LIDAR sensors located at the corners, front, back, sides, and/or top of the vehicle 602. As another example, the cameras may include multiple cameras disposed at various locations about the exterior and/or interior of the vehicle 600. The sensor(s) 606 may provide input to the vehicle computing device(s) 604.

The lidar of the vehicle 100 of FIG. 1 may be configured to provide the data as inputs to the vehicle computing device 604, or as another example, to vehicle computing device(s) 120 of FIG. 1, and particularly to one or more processors for use in operating components stored in memory of the vehicle computing device. The vehicle computing device(s) 604 (and/or vehicle computing devices(s) 120) may include one or more processors 616 and memory 618 communicatively coupled with the one or more processors 616. In the illustrated example, the memory 618 of the vehicle computing device(s) 604 stores a localization component 620, a perception component 622, a planning component 626, one or more maps 628, and one or more system controllers 624. Though depicted in FIG. 6 as residing in memory 620 for illustrative purposes, it is contemplated that the localization component 620, perception component 622, planning component 626, and/or the one or more maps 628 may be accessible to the vehicle 600 (e.g., stored on, or otherwise accessible by, memory remote from the vehicle 600). In some examples, the lidar system 602 may include a memory that is separate from the memory 618. In some examples, the memory may be non-transitory computer readable media having instructions stored thereon which, when executed by the one or more processors, cause the one or more processors to perform the operations described herein.

In some instances, the perception component 622 may include functionality to perform object detection, segmentation, and/or classification. In some examples, the perception component 622 may provide processed sensor data that indicates a presence of an entity that is proximate to the vehicle 600 and/or a classification of the entity as an entity type (e.g., car, pedestrian, cyclist, animal, building, tree, road surface, curb, sidewalk, unknown, etc.). In additional or alternative examples, the perception component 622 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The sensors of the vehicle 102, including the lidar system, may provide the data relating to the objects in the environment, i.e. pedestrians, other vehicles, etc., as inputs to a perception component of the vehicle computing device, such as perception component 622. The perception component may use the data to perform object detection, segmentation, classification, and other data processing to determine characteristics about the objects.

The perception component may assign identifiers to the objects sensed in the environment to enable the object to be tracked within the environment. The perception component may determine values associated with the objects based on the data received from the sensor, to create a data object for each of the objects. It will be appreciated that, although the objects are physical objects sensed in a real-world environment by the vehicle in this example, in other examples the objects may be objects displayed and used in a simulation, or may be objects identified within video data. Simulation data may be received from a planning component such as planning component 626 or localization component such as localization component 620, or from a remote device, such as remote computing device 636. In some examples, the data may comprise map data received from the maps 628 or the other components in memory.

The communication connection 610 may enable communication between the vehicle 600 and one or more other local or remote computing device(s). For instance, the communication connection(s) 610 may facilitate communication with other local computing device(s) on the vehicle 600 and/or the drive system(s) 614. Also, the communication connection(s) 610 may additionally or alternatively allow the vehicle 600 to communicate with other nearby computing device(s) (e.g., other nearby vehicles, traffic signals, etc.). The communication connection(s) 610 may additionally or alternatively enable the vehicle 600 to communicate with the lidar system 602. In some examples, the communication connection 610 may allow the vehicle 600 to communicate with other vehicles having lidar systems and may allow the vehicles to coordinate illumination light pulsing, modulation and/or other characteristics to avoid interferences between lidar systems on different vehicles.

The maps 628 may be used by the vehicle 600 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, multiple maps 628 may be stored based on, for example, a characteristic (e.g., type of entity, time of day, day of week, season of the year, etc.). Storing multiple maps 628 may have similar memory requirements, but increase the speed at which data in a map may be accessed.

The system controller 624 may be configured to control steering, propulsion, braking, safety, emitters, communication, and other systems of the vehicle 600. The system controller(s) 624 may communicate with and/or control corresponding systems of the drive system(s) 614 and/or other components of the vehicle 600. The system controller(s) 624 may be communicatively coupled to one or more sensors of the vehicle sensor system(s) 606.

Emitter(s) 608 may be provided for emitting light and/or sound, and may include interior emitters to communicate with passengers of the vehicle 600 and/or exterior emitter(s) to communicate with pedestrians or other nearby vehicles.

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive system with one or more other local or remote computing device(s).

Example Clauses

A: A light detection and ranging (LIDAR) system comprising: one or more processors; a laser system which, upon receiving a signal from the processor(s) at a first time, generates an illumination light, having a first linear polarization, and emits the illumination light along a first light path; a polarizing beam splitter (PBS) arranged to receive the illumination light from the laser system along the first light path and arranged such that the illumination light exits the from the PBS along a second light path; a collimator arranged to receive the illumination light from the PBS along the second light path and to collimate the illumination light; a quarter wave plate (QWP) arranged to receive the illumination light from the collimator along the second light path, and to pass the illumination light to an object from which the illumination light is reflected, the QWP converting the illumination light to non-linearly polarized light, the QWP receiving the reflected light and converting the reflected light to a second linear polarization, wherein at least one of the collimator and QWP reflects a portion of the illumination light as stray light; a detector arranged proximate the PBS to receive the reflected light from the PBS along a third light path, and configured to detect the reflected light at a second time; and wherein the processor(s) are configured to determine a distance to the object based at least in part on the illumination light and the reflected light.

B: The LIDAR system as clause A describes, wherein the first polarization is P-polarization and the second polarization is S-polarization, and the first light path and the second light path are co-linear and the third light path is perpendicular to the first light path and second light path.

C: The LIDAR system as any one of clauses A to B describe, wherein the first polarization is S-polarization and the second polarization is P-polarization, and the second light path and the third light path are co-linear and the first light path is perpendicular to the second light path and third light path.

D: The LIDAR system as any one of clauses A to C describe, further comprising a scanning mirror, wherein scanning mirror is arranged to direct the illumination light passing through the QWP to the object and to receive the reflected light from the object and to direct the received light to the QWP.

E: The LIDAR system as any one of clauses A to D describe, wherein the laser system comprises a vertical-cavity surface-emitting laser and the detector comprises an imager.

F: A system comprising: a laser system which, upon receiving a signal at a first time, generates an illumination light; a polarizing beam splitter (PBS) arranged to receive the illumination light from the laser system along a first light path and arranged such that the illumination light exits from the PBS along a second light path; a quarter wave plate (QWP) arranged to receive the illumination light exiting from the PBS along the second light path and to pass the illumination light to an object from which the illumination light is reflected; a detector arranged proximate the PBS to receive the reflected light from the PBS along a third light path and to detect the reflected light at a second time; and a processor for determining a distance to the object based at least in part on the illumination light and the reflected light.

G: The system as clause F describes, wherein the illumination light is generated with a first linear polarization and the reflected light detected at the detector has a second linear polarization that is perpendicular to the first linear polarization.

H: The system as any one of clauses F to G describe, wherein the first linear polarization is P-polarization and the second polarization is S-polarization, and the first light path and the second light path are co-linear and the third light path is perpendicular to the first light path and the second light path.

I: The system as any one of clauses F to G describe, wherein the first linear polarization is S-polarization and the second polarization is P-polarization, and the second light path and the third light path are co-linear and the third light path is perpendicular to the second light path and the third light path.

J: The system as any one of clauses F to I describe, further comprising: a lens proximate the PBS and QWP displaced along the second light path such that light passing through the lens from the PBS is collimated and light passing through the lens from the QWP toward the PBS is focused.

K: The system as any one of clauses F to J describe, further comprising a scanning mirror, wherein scanning mirror is arranged to direct the illumination light passing through the QWP to the object and to receive the reflected light from the object and to direct the received light to the QWP.

L: The system as clause F to K describe, wherein the scanning mirror comprises a microelectromechanical system (MEMS) mirror.

M: The system as any one of clauses F to L describe, wherein the laser system comprises a vertical-cavity surface-emitting laser and the detector comprises an imager.

N: The system as any one of clauses F to M describe, wherein the system is part of a vehicle system of an autonomous vehicle that uses the determined distance to the object in monitoring an environment near the autonomous vehicle.

O: A vehicle, comprising: one or more processors; a light detection and ranging (LIDAR) system comprising: a laser system which, upon receiving a signal at a first time, generates an illumination light; a polarizing beam splitter (PBS) arranged to receive the illumination light from the laser system along a first light path and arranged such that the illumination light exits the illumination light from the PBS along a second light path; a quarter wave plate (QWP) arranged to receive the illumination light exiting from the PBS along the second light path and to pass the illumination light to an object from which the illumination light is reflected; a detector arranged proximate the PBS to receive the reflected light from a third light path from the PBS and to detect the reflected light at a second time; and one or non-transitory computer readable media having instructions stored thereon which, when executed by the one or more processors, cause the one or more processors to perform the operations comprising: generate a first signal at a first time to cause the laser system to generate the illumination light; receive, from the detector and at a second time, a second signal; and determining a distance to the object based at least in part on the first signal and second signal.

P: The autonomous vehicle as clause O describes, wherein the vehicle computing device is configured to use the distance data in controlling one or more of steering, propulsion, and braking.

Q: The autonomous vehicle as any one of clauses O to P describe, wherein the illumination light is generated with a P-polarization and the reflected light detected at the detector has an S-polarization, and the first light path and the second light path are co-linear and the third light path is perpendicular to the first light path and second light path.

R: The autonomous vehicle as any one of clauses O to P describe, wherein the illumination light is generated with an S-polarization and the reflected light detected at the detector has a P-polarization, and the second light path and the third light path are co-linear and the first light path is perpendicular to the second light path and third light path.

S: The autonomous vehicle as any one of clauses O to R describe, wherein the LIDAR system further comprises: a scanning mirror, wherein scanning mirror is arranged to direct the illumination light passing through the QWP to the object and to receive the reflected light from the object and to direct the received light to the QWP.

T: The autonomous vehicle as any one of clauses O to S describe, wherein the LIDAR system further comprises: a lens proximate the PBS and QWP displaced along the second light path such that light passing through the lens from the PBS is collimated and light passing through the lens from the QWP toward the PBS is focused.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. A light detection and ranging (LIDAR) system comprising:
    one or more processors;
    a laser system which, upon receiving a signal from the processor(s) at a first time, generates an illumination light, having a first linear polarization, and emits the illumination light along a first light path;
    a polarizing beam splitter (PBS) arranged to receive the illumination light from the laser system along the first light path and arranged such that the illumination light exits from the PBS along a second light path;
    a collimator arranged to receive the illumination light from the PBS along the second light path and to collimate the illumination light;
    a quarter wave plate (QWP) arranged to receive the illumination light from the collimator along the second light path, and to pass the illumination light to an object from which the illumination light is reflected, the QWP converting the illumination light to non-linearly polarized light, the QWP receiving the reflected light and converting the reflected light to a second linear polarization, wherein at least one of the collimator and QWP reflects a portion of the illumination light as stray light; and
    a detector arranged proximate the PBS to receive the reflected light from the PBS along a third light path, and configured to detect the reflected light at a second time, the PBS arranged to direct the reflected light towards the detector and the stray light away from the detector;
    wherein the processor(s) are configured to determine a distance to the object based at least in part on the illumination light and the reflected light.

2. The LIDAR system of claim 1, wherein the first polarization is P-polarization and the second polarization is S-polarization, and the first light path and the second light path are co-linear and the third light path is perpendicular to the first light path and second light path.

3. The LIDAR system of claim 1, wherein the first polarization is S-polarization and the second polarization is P-polarization, and the second light path and the third light path are co-linear and the first light path is perpendicular to the second light path and third light path.

4. The LIDAR system of claim 1, further comprising a scanning mirror, wherein scanning mirror is arranged to direct the illumination light passing through the QWP to the object and to receive the reflected light from the object and to direct the received light to the QWP.

5. The LIDAR system of claim 1, wherein the laser system comprises a vertical-cavity surface-emitting laser and the detector comprises an imager.

6. A system comprising:
    a laser system which, upon receiving a signal at a first time, generates an illumination light;
    a polarizing beam splitter (PBS) arranged to receive the illumination light from the laser system along a first light path and arranged such that the illumination light exits from the PBS along a second light path;
    a quarter wave plate (QWP) arranged to receive the illumination light exiting from the PBS along the second light path and to pass the illumination light to an object from which the illumination light is reflected, wherein a portion of the illumination light is reflected from a component of the system as stray light;
    a detector arranged proximate the PBS to receive the reflected light from the PBS along a third light path and to detect the reflected light at a second time, the PBS arranged to direct the reflected light towards the detector and the stray light away from the detector; and
    a processor for determining a distance to the object based at least in part on the illumination light and the reflected light.

7. The system as defined in claim 6, wherein the illumination light is generated with a first linear polarization and the reflected light detected at the detector has a second linear polarization that is perpendicular to the first linear polarization.

8. The system as defined in claim 7, wherein the first linear polarization is P-polarization and the second polarization is S-polarization, and the first light path and the second light path are co-linear and the third light path is perpendicular to the first light path and the second light path.

9. The system as defined in claim 7, wherein the first linear polarization is S-polarization and the second polarization is P-polarization, and the second light path and the third light path are co-linear and the third light path is perpendicular to the second light path and the third light path.

10. The system as defined in claim 6, further comprising:
a lens proximate the PBS and QWP displaced along the second light path such that light passing through the lens from the PBS is collimated and light passing through the lens from the QWP toward the PBS is focused.

11. The system as defined in claim 6, further comprising a scanning mirror, wherein scanning mirror is arranged to direct the illumination light passing through the QWP to the object and to receive the reflected light from the object and to direct the received light to the QWP.

12. The system as defined in claim 11, wherein the scanning mirror comprises a microelectromechanical system (MEMS) mirror.

13. The system as defined in claim 6, wherein the laser system comprises a vertical-cavity surface-emitting laser and the detector comprises an imager.

14. The system as defined in claim 6, wherein the system is part of a vehicle system of an autonomous vehicle that uses the determined distance to the object in monitoring an environment near the autonomous vehicle.

15. A vehicle, comprising:
one or more processors;
a light detection and ranging (LIDAR) system comprising:
a laser system which, upon receiving a signal at a first time, generates an illumination light;
a polarizing beam splitter (PBS) arranged to receive the illumination light from the laser system along a first light path and arranged such that the illumination light exits the illumination light from the PBS along a second light path;
a quarter wave plate (QWP) arranged to receive the illumination light exiting from the PBS along the second light path and to pass the illumination light to an object from which the illumination light is; reflected, wherein a portion of the illumination light is reflected from a component of the system as stray light; and
a detector arranged proximate the PBS to receive the reflected light from a third light path from the PBS and to detect the reflected light at a second time, the PBS arranged to direct the reflected light towards the detector and the stray light away from the detector; and
one or more non-transitory computer readable media having instructions stored thereon which, when executed by the one or more processors, cause the one or more processors to perform the operations comprising:
generate a first signal at a first time to cause the laser system to generate the illumination light;
receive, from the detector and at a second time, a second signal; and
determining a distance to the object based at least in part on the first signal and second signal.

16. The vehicle as defined in claim 15, wherein the operations comprise controlling one or more of steering, propulsion, and braking of the vehicle based at least in part on the distance to the object.

17. The vehicle as defined in claim 15, wherein the illumination light is generated with a P-polarization and the reflected light detected at the detector has an S-polarization, and the first light path and the second light path are co-linear and the third light path is perpendicular to the first light path and second light path.

18. The vehicle as defined in claim 15, wherein the illumination light is generated with an S-polarization and the reflected light detected at the detector has a P-polarization, and the second light path and the third light path are co-linear and the first light path is perpendicular to the second light path and third light path.

19. The vehicle as defined in claim 15, wherein the LIDAR system further comprises:
a scanning mirror, wherein scanning mirror is arranged to direct the illumination light passing through the QWP to the object and to receive the reflected light from the object and to direct the received light to the QWP.

20. The vehicle as defined in claim 15, wherein the LIDAR system further comprises:
a lens proximate the PBS and QWP displaced along the second light path such that light passing through the lens from the PBS is collimated and light passing through the lens from the QWP toward the PBS is focused.

* * * * *